(12) United States Patent
Tsai et al.

(10) Patent No.: US 11,754,854 B2
(45) Date of Patent: Sep. 12, 2023

(54) HEAD MOUNTED DISPLAY DEVICE

(71) Applicant: HTC Corporation, Taoyuan (TW)

(72) Inventors: Meng-Che Tsai, Taoyuan (TW);
Kuei-Chun Liu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 56 days.

(21) Appl. No.: 17/351,264

(22) Filed: Jun. 18, 2021

(65) Prior Publication Data

US 2022/0404636 A1 Dec. 22, 2022

(51) Int. Cl.
*G02B 30/35* (2020.01)
*G02B 30/36* (2020.01)
*G02B 27/14* (2006.01)
*H04N 13/344* (2018.01)

(52) U.S. Cl.
CPC .......... *G02B 30/35* (2020.01); *G02B 27/149* (2013.01); *G02B 30/36* (2020.01); *H04N 13/344* (2018.05)

(58) Field of Classification Search
CPC ........ G02B 30/00; G02B 30/10; G02B 30/20; G02B 30/22; G02B 30/26; G02B 30/23; G02B 30/24; G02B 30/33; G02B 30/34; G02B 30/35; G02B 30/40; G02B 30/60; G02B 27/149; G02B 30/36; H04N 13/344
USPC ........................................................ 359/471
See application file for complete search history.

(56) References Cited

U.S. PATENT DOCUMENTS

| | | | | |
|---|---|---|---|---|
| 10,326,977 B1 * | 6/2019 | Mercier | ............... | H04N 13/344 |
| 2003/0067423 A1 * | 4/2003 | Suyama | ................. | H04N 13/32 348/E13.052 |
| 2010/0109980 A1 * | 5/2010 | Tohara | ............... | G02B 27/0172 345/32 |
| 2013/0135722 A1 * | 5/2013 | Yokoyama | ......... | G02B 27/0172 359/489.08 |
| 2018/0164599 A1 * | 6/2018 | Hu | ..................... | G02B 27/0093 |

FOREIGN PATENT DOCUMENTS

| | | | | |
|---|---|---|---|---|
| CN | 1894975 A | * | 1/2007 | ......... G02B 19/0028 |
| CN | 107209390 | | 9/2017 | |
| DE | 102013226654 A1 | * | 6/2015 | ........... G02B 27/149 |

OTHER PUBLICATIONS

Office Action of Taiwan Counterpart Application, dated Dec. 13, 2021, pp. 1-6.

* cited by examiner

*Primary Examiner* — Jade R Chwasz
(74) *Attorney, Agent, or Firm* — JCIPRNET

(57) ABSTRACT

A head mounted display including a first display, a second display, a third display, and an optical element is provided. The first display projects a first image to a first target area. The second display projects a second image to a second target area. The third display projects a third image. The optical element is disposed among the first target area, the second target area, the first display, the second display, and the third display. The optical element transmits the first image to the first target area and the second image to the second target area, and reflects the third image toward the first target area and the second target area.

7 Claims, 2 Drawing Sheets

HEAD MOUNTED DISPLAY DEVICE

BACKGROUND

Technical Field

The disclosure relates to an electronic device, and in particular to a head mounted display device.

Description of Related Art

With the advancement of electronic technology, there is an increasing requirement for visual experience effects when people use electronic devices. In the technical field of head mounted display devices, an important indicator in the quality of an optical product is whether dizziness that might occur to a user during visual experience can be reduced. In addition, a design of a multi-layer display is an issue that has generated a significant amount of discussion. For example, conventionally, multiple image planes are often used to solve the problem of vergence-accommodation conflict, and the image planes can thus effectively alleviate the visual discomfort caused by wearing a head mounted display device. Conventionally, the architecture of a multi-layer display often requires more elements and an increased volume, hence the difficulty in achieving prevention from dizziness caused by visual experience, lightness and comfort in wearing, and affordable cost of consumer electronics at the same time.

SUMMARY

The disclosure provides a head mounted display device that improves the comfort of visual experience and provides a multi-layer display effect.

A head mounted display device of the disclosure includes a first display, a second display, a third display, and an optical element. The first display projects a first image to a first target area. The second display projects a second image to a second target area. The third display projects a third image. The optical element is disposed among the first target area, the second target area, the first display, the second display, and the third display. The optical element transmits the first image to the first target area, transmits the second image to the second target area, and reflects the third image toward the first target area and the second target area.

Based on the above, in the head mounted display device of an embodiment of the disclosure, the optical element transmits the first image to the first target area, transmits the second image to the second target area, and reflects the third image toward the first target area and second target area, so multiple images with different depths are delivered to the user's eyes. The disclosure, under the premise of providing a multi-layer display effect, reduces the user's vergence-accommodation conflict during operation, and improves comfort during long-term operation.

To further describe the above features and advantages of the disclosure, embodiments accompanied with drawings are described below in details.

DESCRIPTION OF THE EMBODIMENTS

Figure 1:
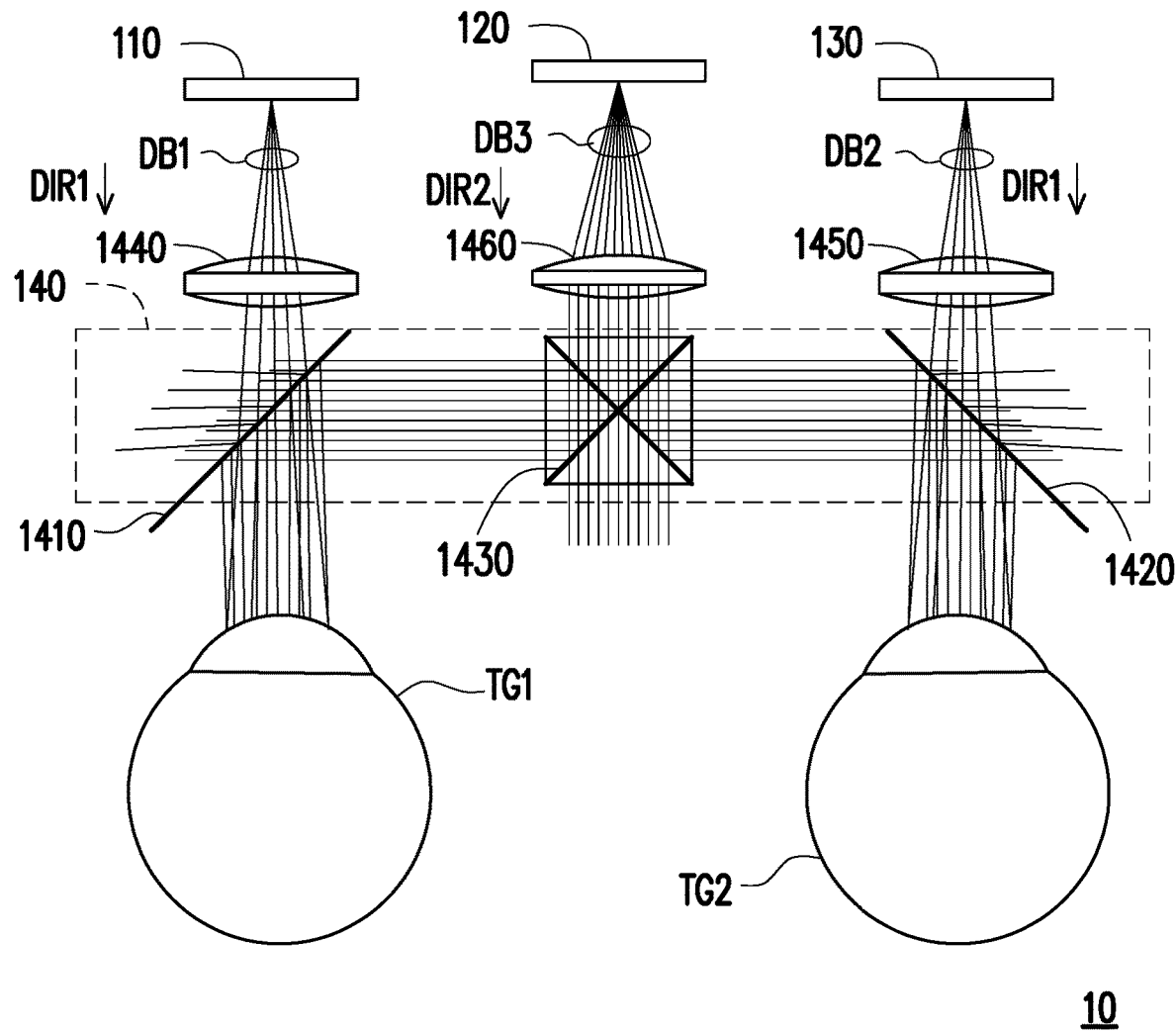
FIG. 1 is a schematic diagram of a head mounted display device according to the first embodiment of the disclosure.

The embodiments are described only with reference to the directions according to the drawings. Therefore, the directional terms are used for explanation, not for limiting the disclosure. In the drawings, each drawing illustrates the general characteristics of the method, structure, and/or materials used in a specific exemplary embodiment. However, these drawings should not be construed as defining or limiting the scope or properties covered by these exemplary embodiments. For example, for clarity, the relative size, thickness, and position of each layer, area, and/or structure may be reduced or enlarged.

In the embodiments, same or like labels are used to refer to same or like elements, and their descriptions thereof will not be repeated. In addition, the features in different exemplary embodiments may be combined when the features do not conflict with each other, and simple equivalent changes and modifications made according to this specification or the claims are still within the scope covered by this patent. In addition, the terms "first" and "second" mentioned in this specification or the claims are only used to name discrete elements or to distinguish different embodiments or scopes, and are not used to limit the upper or lower limit of the number of elements or the manufacturing order or the disposition order of the elements.

FIG. 1 is a schematic diagram of a head mounted display device 10 according to the first embodiment of the disclosure. An embodiment of the disclosure provides the head mounted display device 10. The head mounted display device 10 allows users to wear and provides display effects of virtual reality, augmented reality, or mixed reality. Referring to FIG. 1, in this embodiment, the head mounted display device 10 includes a first display 110, a second display 130, a third display 120, and an optical element 140. In other embodiments, the types and quantities of components may be adjusted according to requirements or application scenarios, and the disclosure is not limited thereto.

The first display 110 and the second display 130 are disposed corresponding to two eyes, and may respectively display different images, but the disclosure is not limited thereto. In some embodiments, the first display 110 and the second display 130 may display a same image, and one of the first display 110 and the second display 130 may not display an image. In this embodiment, the third display 120 is disposed between the first display 110 and the second display 130.

In this embodiment, the first display 110 and the second display 130 provide two images with parallax, thereby allowing users to see a three-dimensional image.

The optical element 140 is disposed among a first target area TG1 corresponding to a user's left eye area, a second target area TG2 corresponding to the user's right eye area, the first display 110, the second display 130, and the third display 120. The optical element 140 includes a first beam splitter 1410, a second beam splitter 1420, a third beam splitter 1430, a first lens 1440, a second lens 1450, and a third lens 1460.

The first beam splitter 1410 is disposed between the first target area TG1 and the first display. The second beam splitter 1420 is disposed between the second target area TG2 and the second display. The third beam splitter 1430 may be disposed between the first beam splitter 1410 and the second beam splitter 1420. In this embodiment, the first beam splitter 1410 and the second beam splitter 1420 may be planar beam splitters, and the third beam splitter 1430 is an X-shaped beam splitter. The third beam splitter 1430 may be formed by four prisms, and the four prisms have beam splitting coating on the surfaces thereof. Through image synthesis performed by the third beam splitter and the first beam splitter or the second beam splitter 1430, ghosting and stray light may be separated from an effective image light path to ensure image quality and contrast.

The first lens 1440 is disposed between the first beam splitter 1410 and the first display 110. The second lens 1450 is disposed between the second beam splitter 1420 and the second display 130. The third lens 1460 is disposed between the third beam splitter 1430 and the third display 120. In this embodiment, the first lens 1440, the second lens 1450, and the third lens 1460 are, for example, fixed-focus lenses, but the disclosure is not limited thereto. In other embodiments, the first lens 1440, the second lens 1450, and the third lens 1460 may be zoom lenses, and the zoom lens is, for example, a liquid crystal lens (LC lens), but the disclosure is not limited thereto. The focal length of the third lens 1460 may be the same or different from the focal lengths of the first lens 1440 and the second lens 1450, and the disclosure is not limited thereto.

The first display 110 and the second display 130 are used to respectively project a first image DB1 and a second image DB2 to the first target area TG1 and the second target area TG2 along a first direction DIR1. The first image DB1 and the second image DB2 respectively penetrate the first beam splitter 1410 and the second beam splitter 1420 to be projected to the first target area TG1 and the second target area TG2.

The third display 120 projects a third image DB3 to the third beam splitter 1430 along a second direction DIR2. Through a plurality of beam splitting coatings of the third beam splitter 1430, the third image DB3 may be reflected, so that the third image DB3 is projected to the first target area TG1 and the third image DB3 is projected to the second target area TG2, too. In this embodiment, the second direction DIR2 may be the same as the first direction DIR1. The third image DB3 may be a remote image without parallax. The third image DB3 that is reflected may be delivered to the first target area TG1 of the user's left eye area and the second target area TG2 of the user's right eye area. According to the above, the user's left and right may receive the same third image DB3 at the same time, and a coordinated image is obtained by the user.

In this embodiment, the luminance of the first image DB1 and second image DB2 respectively generated by the first display 110 and the second display 130 may be different from the luminance of the third image 120 generated by the third display 120. For example, the luminance of the first image DB1 and the second image DB2 as the foreground may be adjusted to be higher than the luminance of the third image DB3 as the background.

On the other hand, for the user's visual experience, the first image DB1, the second image DB2, and the third image DB3 may respectively have different depths of field. In this embodiment, the first image DB1, the second image DB2, and the third image DB3 may respectively be imaged on imaging surfaces with different depths, and the depth of field of the third image DB3 may be greater than the depth of field of the first image DB1 and the second image DB2. The first image DB1 and the second image DB2 may have substantially equal depth of field. In this way, a plurality of objects in the image observed by the user may be the same as the actual image, and there may be a plurality of different depths of field according to the position of the objects, and dizziness caused by the vergence-accommodation conflict experienced by the user may thus be effectively reduced, thereby providing more comfort to the user.

Incidentally, in an embodiment of the disclosure, the first display 110, the second display 130, and the third display 120 may be selected from a liquid crystal on silicon (LCOS) display, a digital micromirror device (DMD) display, an organic light emitting diode (OLED) display, a liquid crystal display (LCD), a micro light emitting diode (Micro-LED) display, or a combination of two of the above.

It is worth mentioning that in an embodiment of the disclosure, the first display 110 and the second display 130 may share a same display panel. A first area of the display panel may be planned as the first display 110 and a second area of the display panel may be planned as the second display 110. Alternatively, in another embodiment of the disclosure, two independent display panels may respectively be used to form the first display 110 and the second display 130.

Figure 2:
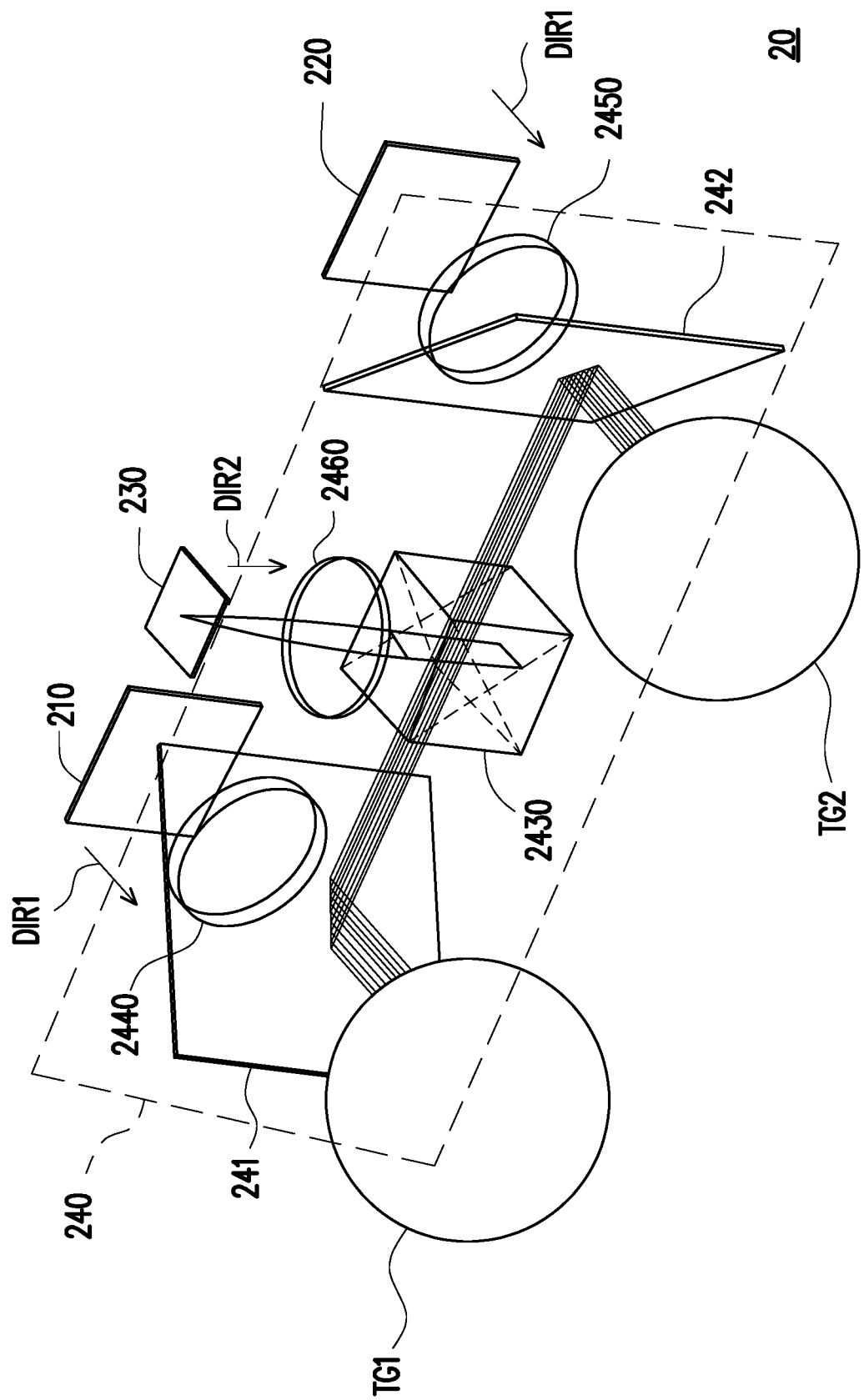
FIG. 2 is a schematic diagram of a head mounted display device according to the second embodiment of the disclosure.

FIG. 2 is a schematic diagram of a head mounted display device 20 according to the second embodiment of the disclosure. The head mounted display device 20 includes a first display 210, a second display 220, a third display 230, and an optical element 240. The optical element 240 includes a first beam splitter 241, a second beam splitter 242, a third beam splitter 2430, a first lens 2440, a second lens 2450, and a third lens 2460.

Each element in this embodiment may be the same as each element in the embodiment of FIG. 1. The difference between this embodiment and the embodiment of FIG. 1 is that the third display 230 in this embodiment is not disposed between the first display 210 and the second display 220. Specifically, the first display 210 and the second display 220 may respectively project a first image and a second image along the same first direction DIR1, and the third display 230 may project the second image along the second direction DIR2 which is different from the first direction DIR1. The first direction DIR1 and the first direction DIR2 may have a predetermined included angle that is not 0 degrees. In some of the embodiments in the disclosure, the aforementioned predetermined included angle may be 90 degrees, or any angle other than 90 degrees.

In summary, the head mounted display device of the disclosure provides a multi-layer display effect and reduces vergence-accommodation conflict through being disposed with an additional third display and using the third display to provide parallax images to the left and right eyes of the user. In addition, through the third image provided by the third display, the luminance of the overall display image produced by the head mounted display device may be improved, thereby improving display quality.

What is claimed is:
1. A head mounted display device, comprising:
a first display, projecting a first image to a first target area;
a second display, projecting a second image to a second target area;
a third display, projecting a third image; and
an optical element, disposed among the first target area, the second target area, the first display, the second display, and the third display, wherein the optical element transmits the first image to the first target area, transmits the second image to the second target area, and reflects the third image toward the first target area and the second target area, the optical element comprising:
a first beam splitter, disposed between the first target area and the first display;

a first lens, disposed between the first beam splitter and the first display;

a second beam splitter, disposed between the second target area and the second display;

a second lens, disposed between the second beam splitter and the second display;

a third beam splitter, being an X-shaped beam splitter, disposed between the first beam splitter and the second beam splitter; and a third lens, disposed between the third beam splitter and the third display, wherein a focal length of the third lens is different from a focal length of the first lens and a focal length of the second lens, wherein a depth of field of the third image is greater than a depth of field of the first image and a depth of field of the second image so as to reduce the vergence-accommodation conflict of a user.

2. The head mounted display device according to claim 1, wherein the first target area corresponds to a left eye area of the user, and the second target area corresponds to a right eye area of the user.

3. The head mounted display device according to claim 1, wherein the first display and the second display respectively project the first image and the second image along a first direction, and the third display projects the third image along a second direction.

4. The head mounted display device according to claim 3, wherein the second direction is the same as or different from the first direction.

5. The head mounted display device according to claim 4, wherein the first direction and the second direction have a predetermined included angle that is not 0 degrees.

6. The head mounted display device according to claim 5, wherein the predetermined included angle is 90 degrees.

7. The head mounted display device according to claim 1, wherein the first display and the second display share a same display panel.

* * * * *